United States Patent
Itoh et al.

[11] Patent Number: 5,319,695
[45] Date of Patent: Jun. 7, 1994

[54] MULTILAYER FILM REFLECTOR FOR SOFT X-RAYS

[75] Inventors: Kazuhiko Itoh; Izumi Kataoka, both of Tokyo, Japan

[73] Assignee: Japan Aviation Electronics Industry Limited, Tokyo, Japan

[21] Appl. No.: 45,763

[22] Filed: Apr. 14, 1993

[30] Foreign Application Priority Data

Apr. 21, 1992 [JP] Japan ................................ 4-100072

[51] Int. Cl.⁵ ............................................. B32B 7/02
[52] U.S. Cl. ....................................... 378/84; 378/85; 378/145
[58] Field of Search ........................... 378/84, 85, 145; 428/912.2

[56] References Cited

U.S. PATENT DOCUMENTS 4,684,565  8/1987  Abeles et al. .......................... 378/84

FOREIGN PATENT DOCUMENTS 0183471  6/1986  European Pat. Off. .
92/02936  2/1992  World Int. Prop. O. .

OTHER PUBLICATIONS

"Diffusion in Mo/Si Multilayers; [etc]" by Loopstra et al LeVide Les Couches Minces, vol. 42, No. 236, Mar. 24, 1987, pp. 71-73.
"The Optical Band Gap of Multilayers of a Sci H and Alloys; [etc]" by Bernhard et al, Journal of Non-Crystalline Solids, vol. 137, No. 2, Dec. 1991, pp. 1103-1106.
"Structure of Si/SiO$_2$ Thin Multilayers [etc]", by Yachi, Journal of Vacuum Science and Technology, Part A., vol. 7, No. 2, Mar. 2, 1989, pp. 159-161.
"Influence of Hydrogen Plasma in the Properties of a SiiH/a-Si C:H Interfaces" by Fantini et al, Proc. of 10th E.C. Photovoltaic Solar Energy Conf., Apr. 8-12, 1991, pp. 329-332.

Primary Examiner—David P. Porta
Assistant Examiner—Don Wong
Attorney, Agent, or Firm—Pollock, VandeSande and Priddy

[57] ABSTRACT

On a substrate materials of different X-ray refractive indexes, for example, silicon (si) and molybdenum (Mo), are alternately deposited to form a multilayer film composed of silicon nd molybdenum layers and a hydrogenated interface layer is formed between each pair of adjacent layers.

2 Claims, 1 Drawing Sheet

MULTILAYER FILM REFLECTOR FOR SOFT X-RAYS

BACKGROUND OF THE INVENTION

The present invention relates to an X-ray reflector which is used in a lens reduction projection aligner for the manufacture of semiconductor devices and, more particularly, to an X-ray multilayer film reflector which exhibits high reflectivity for soft X-rays of wavelengths ranging from several to tens of nanometers.

Conventional soft X-ray multilayer film reflectors usually have a multilayer structure formed by depositing two kinds of materials of different refractive indexes to predetermined thicknesses alternately through use of a vacuum evaporation, sputtering or similar method.

Conventionally, the two materials are chosen mainly by the following three criteria so as to obtain a soft X-ray multilayer film reflector of great reflectivity. First the two kinds of materials do not much absorb X rays; second, they have greatly different refractive indexes; third, they have a definite boundary without any reaction or diffusion between them and the interface remains smooth.

Since the refractive index of each material depends on the wavelength of soft X rays as well, combinations of materials which fulfill the above-noted criteria are limited for each specified wavelength. Some materials, when combined, are liable to react with each other at the mutual interface to form an intermediate product and some materials are also apt to incur interdiffusion. In the case where the multilayer structure is formed using a combination of materials which are liable to interaction or interdiffusion, the interface gets rough or the boundary gets indefinite owing to the interaction or interdiffusion between the materials used. In such an instance, the intended reflectivity cannot be obtained, or the interaction gradually proceeds and the multilayer structure is destroyed, resulting in the performance being impaired. Such combinations of materials do not fulfill the aforementioned third criterion and cannot be employed because of the above-noted defects, even if they are expected to provide a high reflectivity.

SUMMARY OF THE INVENTION

It is therefore an object of the present invention to provide a soft X-ray multilayer film reflector of high reflectivity which has a multilayer film free from interaction or interdiffusion between two different materials at their interface.

According to the present invention, there is provided a soft X-ray multilayer film reflector which has a multilayer structure wherein two kinds of materials of different indexes of X-ray refraction (hereinafter referred to as "high" and "low" refractive index layers) are deposited alternately with each other, the high and low refractive index layers have thicknesses selected such that X rays reflected at the boundary between the respective layers intensify each other, and the interface of the high and low refractive index layers is formed by a hydrogenated surface of one of the layers.

Since the interface between the respective layers forming the multilayer film of the soft X-ray multilayer film reflector according to the present invention is hydrogenated as mentioned above, the interface is smooth and does not allow any interaction or interdiffusion between the two kinds of materials, ensuring that the reflector possesses high reflectivity.

Next, a description will be given of the reason for which the interface between respective layers is smooth when it is hydrogenated. Generally speaking, in materials atoms or molecules are attached to each other by bonds but in the material surface there exist free bonds which are not linked to any atoms or molecules. Such free bonds are unstable but usually they combine with oxygen in the air, for instance, and hence stabilize. In the fabrication of the multilayer film structure, layers of first and second materials are formed alternately with each other by vapor evaporation, for example; in this instance, free bonds in the surface of the first material layer combine with the surface of the second material layer and stabilize. At this time, if the materials of the both layers are more stable in terms of energy in the case where the respective materials are each in the form of a simple body constituted from a single species of atom than in the case where the materials combine with each other to form a compound or solid solution, the number of atoms having bonds linked to other species of atoms is held minimum. That is, since the bonding of the two materials is limited specifically to the interface, the boundary between the two materials is clear and the interface is smooth. However, in the case where the respective materials are stable in terms of energy when they form a compound or solid solution constituted from different species of atoms, the number of atoms which are separated from the same species of atoms bonded so far and combined with other species of atoms increases, the interaction of interdiffusion between the two materials proceeds to form a compound or solid solution, and the interface may sometimes becomes rough.

According to the present invention, since free bonds remaining in the interface of each pair of opposed layers forming the multilayer film structure are combined with hydrogen atoms as referred to above, the interface stabilizes in itself. Moreover, since the layer bonded to the hydrogen atoms, i.e. the hydrogenated layer serves as a buffer, the opposed layers form a smooth interface therebetween without causing any interaction or interdiffusion. The layers are linked by hydrogen bonding between hydrogen atoms and the materials forming the layers. The hydrogen atom absorbs X rays least and the influence of hydrogen on the reflectivity of the layer is negligible.

DESCRIPTION OF THE PREFERRED EMBODIMENT

Figure 1:
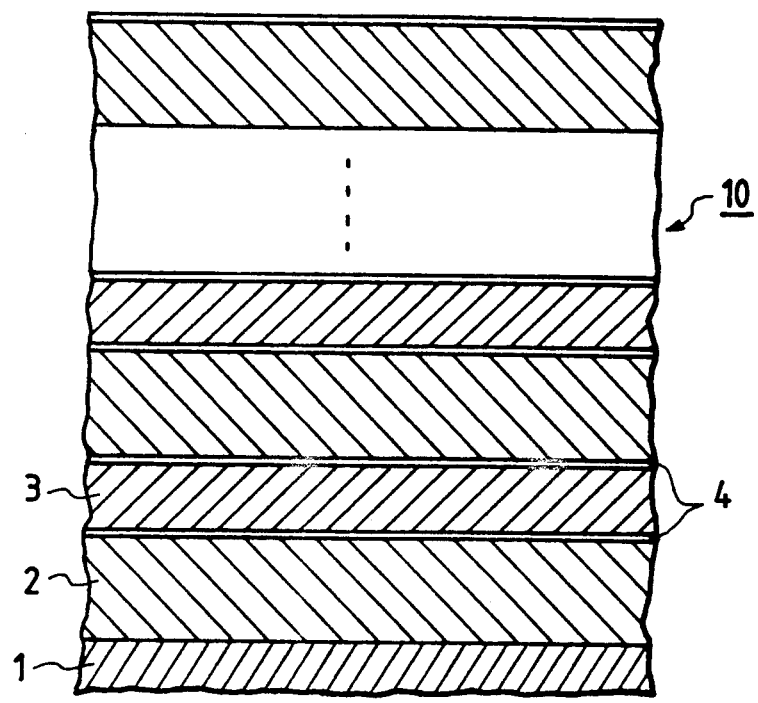
FIG. 1 is a sectional view of the soft X-ray multilayer film reflector according to the present invention.

An embodiment of the present invention will be described with reference to the drawings. FIG. 1 illustrates, in section, a soft X-ray multilayer film reflector 10 formed according to the present invention. In the present invention, materials which exhibit different refractive indexes for X rays, for example, molybdenum (Mo) and silicon (Si), are alternately deposited to form a multilayer film structure composed of molybdenum and silicon layers 2 and 3. High and low refractive index layers (which are the silicon and molybdenum layers 3 and 2, respectively) in this multilayer film structure are formed, for instance, 5 nm thick, a value that allows X rays reflected at the interfaces of the respective pairs of opposed layers to be intensified by each other. The interfaces are each hydrogenized interface to form a hydrogenized layer 4.

Figure 2:
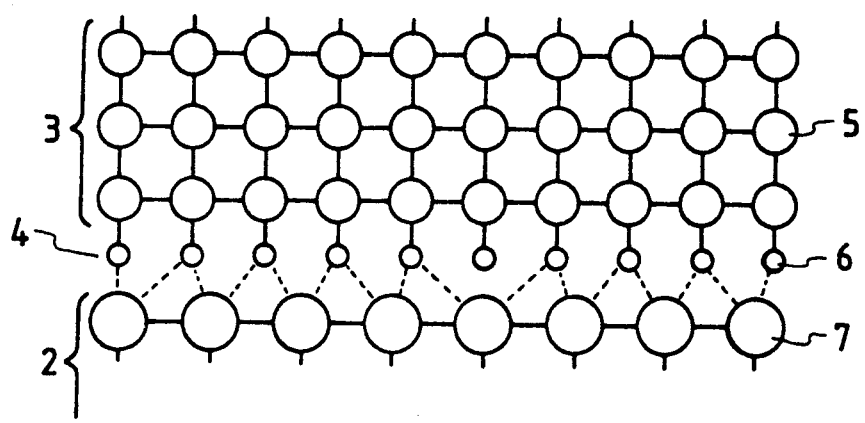
FIG. 2 is a diagram schematically showing the interface of a hydrogenized molybdenum layer and a silicon layer.

The fabrication of the soft X-ray multilayer film reflector starts with evaporating, for example, molybdenum (Mo), in a vacuum evaporator to form the molybdenum layer 2 to a predetermined thickness on a substrate 1, followed by introducing hydrogen gas into the vacuum evaporator in an amount equivalent to several cubic centimeters under 1 atmospheric pressure, for instance. The hydrogen gas diffuses in the vacuum and, within about several seconds, it combines with free bonds in the surface of the molybdenum layer 3. As shown in FIG. 2, molybdenum atoms 7 in the surface of the molybdenum layer 3 and hydrogen atoms 6 combine with each other. Uncombined excess hydrogen gas is removed by evacuation. This is followed by evaporating, for example, silicon (Si), to form the silicon layer 3 to a predetermined thickness. The molybdenum atoms 7 in the surface of the molybdenum layer 2 and the hydrogen atoms 6 are bonded by loose hydrogen bonding, and consequently the silicon layer 3 and the molybdenum layer 2 are bonded by the loose hydrogen bonding.

It is well-known in the art that the multilayer film formed by the combination of molybdenum and silicon exhibits a high reflectivity to soft X rays in a wavelength region of about 10 nm, but it is also well-known that a compound called molybdenum silicide is liable to form in the interface of the molybdenum layer and the silicon layer and that a diffused layer is also formed in the interface. In accordance with the present invention, upon each formation of the respective layers, for instance, the molybdenum and silicon layers 2 and 3, their surfaces are treated with hydrogen to form thin buffer layers 4 (a hydrogenated molybdenum layer and a hydrogenated silicon layer, which will hereinafter be referred to as hydrogenated interface layers). The hydrogenated interface layers prevent the aforementioned interaction or interdiffusion at the interfaces and, furthermore, prevent them from becoming indefinite or rough, ensuring the fabrication of the soft X-ray multilayer film reflector 10 of high reflectivity.

FIG. 2 schemtically shows the interface of the hydrogenated molybdenum and silicon layers 2 and 3. In the surface of the molybdenum layer 2 the molybdenum atoms 7 and the hydrogen atoms 6 are loosely bonded by hydrogen bonding and in the surface of the silicon layer 3 silicon atoms 5 and the hydrogen atoms combine with each other. Thus the molybdenum layer 2 and the silicon layer 3 are bonded and the interface is held smooth.

While in the above the multilayer film has been described to be formed by the combination of molybdenum and silicon, it is also possible to employ various combinations of materials respectively having higher and lower X-ray refractive indexes, such as a combination of tungsten (W) and silicon (Si), or nickel (Ni) and carbon (C).

According to the present invention, materials of different X-ray refractive indexes, for instance, molybdenum and silicon, are alternately deposited to form a multilayer film on a substrate and the thicknesses of the high and low refractive index layers (i.e. the silicon and molybdenum layers, respectively) are chosen such that X rays reflected at the interfaces of the respective layers are intensified by each other. Moreover, since the surface of each layer is treated with hydrogen to form a hydrogenated interface layer between adjacent high and low refractive index layers, it is possible to prevent it from getting blurred or rough. Hence a soft X-ray multilayer reflector of high reflectivity can be obtained. In addition, the hydrogen atom has the lowest X-ray absorptivity, and hence exerts substantially no influence on the reflectivity of the reflector.

It will be apparent that many modifications and variations may be effected without departing from the scope of the novel concepts of the present invention.

What is claimed is:

1. A soft X-ray multilayer film reflector which has a multilayer film structure formed adjacent higher and lower refractive index layers among the different refractive index layers of said multilayer film structure are chosen such that X rays reflected at the boundaries between said adjacent layers are intensified by each other, said adjacent higher and lower refractive index layers being separated from one another by a hydrogenated interface layer that is thinner than either of said adjacent layers.

2. The soft X-ray multilayer film reflector of claim 1, wherein each said higher refractive index layer is a molybdenum layer and each said lower refractive index layer is a silicon layer.

* * * * *

UNITED STATES PATENT AND TRADEMARK OFFICE
CERTIFICATE OF CORRECTION

PATENT NO. : 5,319,695
DATED : June 7, 1994
INVENTOR(S) : Kazuhiko Itoh; Izumi Kataoka It is certified that error appears in the above-identified patent and that said Letters Patent is hereby corrected as shown below:

On title page item [57] Abstract:

Line 2 change "si" to --Si--
   Line 4 change "nd" to --and--

Col. 3 line 5 delete "interface"
         line 6 after "hydrogenized" insert --interface--

In Claim 1:

Col. 4 line 35 after "formed" insert --of adjacent layers of
              alternate materials of different X-ray
              refractive indexes in which the thicknesses
              of--

Signed and Sealed this

Twenty-seventh Day of September, 1994

Attest:

BRUCE LEHMAN

Attesting Officer      Commissioner of Patents and Trademarks